US008262296B2

(12) United States Patent
Liao et al.

(10) Patent No.: US 8,262,296 B2
(45) Date of Patent: Sep. 11, 2012

(54) CONNECTOR HAVING AN FLOATABLE OPTICAL MODULE

(75) Inventors: Chi-Nan Liao, Tu-Cheng (TW); Qi-Sheng Zheng, Kunshan (CN); Jia-Yong He, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 277 days.

(21) Appl. No.: 12/781,839

(22) Filed: May 18, 2010

(65) Prior Publication Data

US 2010/0290745 A1 Nov. 18, 2010

(30) Foreign Application Priority Data

May 18, 2009 (CN) .......................... 2009 2 0303264
May 18, 2009 (CN) .......................... 2009 2 0303273

(51) Int. Cl.
 *G02B 6/36* (2006.01)
 *H01R 33/945* (2006.01)
(52) U.S. Cl. ................ 385/90; 385/92; 385/93; 385/88; 385/89; 385/81; 439/577
(58) Field of Classification Search .................... 385/53, 385/62, 65, 70, 72, 77, 78, 81, 83, 88, 89, 385/90, 92, 93, 94, 139; 439/577; 398/135, 398/138, 139
See application file for complete search history.

(56) References Cited

U.S. PATENT DOCUMENTS

| 6,500,026 | B2 * | 12/2002 | Yamaguchi | 439/577 |
| 7,422,488 | B1 * | 9/2008 | Wu | 439/676 |
| 7,896,559 | B2 * | 3/2011 | Yi et al. | 385/75 |
| 2010/0158448 | A1 * | 6/2010 | Yi et al. | 385/74 |
| 2010/0290745 | A1 * | 11/2010 | Liao et al. | 385/90 |
| 2011/0103752 | A1 * | 5/2011 | Little et al. | 385/93 |
| 2011/0255825 | A1 * | 10/2011 | Ko et al. | 385/15 |

FOREIGN PATENT DOCUMENTS

WO 2008121731 10/2008

* cited by examiner

*Primary Examiner* — Brian Healy
(74) *Attorney, Agent, or Firm* — Wei Te Chung; Andrew C. Cheng; Ming Chieh Chang

(57) ABSTRACT

A connector (100) includes an insulative housing (1) having a receiving slot (121) formed therein and a post (1221) protruding forwardly towards the receiving slot (121); a set of contacts (2) retained in the insulative housing; an optical module (3) for transmitting optical data and being movably received in the receiving slot along a front-to-back direction; and a compression coil spring (4) sandwiched between the insulative housing and the optical module, and having a front end for biasing the optical module (3) forwardly and a rear end for being retained on the post (1221).

17 Claims, 10 Drawing Sheets

US 8,262,296 B2

CONNECTOR HAVING AN FLOATABLE OPTICAL MODULE

BACKGROUND OF THE INVENTION

1. Field of the Invention

The present invention relates to a connector, more particularly to a connector having an optical module for transmitting optical data.

2. Description of Related Art

At present, Universal Serial BUS (USB) is a widely used input/output interface adapted for many electronic devices, such as personal computer and related peripherals. In 1994, Intel, HP, IBM, NEC etc. together founded USB-IF to define a spec of USB. Nowadays, USB-IF has published several editions for USB, and transmitting rate of USB has became higher and higher. As development of electronic industry, higher transmitting rate of USB based connection accessory is needed.

An optical universal serial bus (OUSB) has been disclosed to be adopted for optical data transmission. The OUSB includes a USB connector with a number of lenses embedded in the USB connector and further connected with respective fibers for transmitting optical signal. Therefore, the OUSB can transmit signals up to 10 Gbps. However, as the lens are fixed to the USB connector, and they may fail to mate with counterparts if excessive clearance exits in manufacturing process.

Hence, an improved connector with a floatable optical module is desired to overcome the above problems.

BRIEF SUMMARY OF THE INVENTION

According to one aspect of the present invention, a connector comprises an insulative housing having a receiving slot formed therein and a post protruding forwardly towards the receiving slot; a plurality of contacts retained in the insulative housing; an optical module for transmitting optical data and being movably received in the receiving slot along a front-to-back direction; and a compression coil spring sandwiched between the insulative housing and the optical module, and having a front end for biasing the optical module forwardly and a rear end for being retained on the post.

According to another aspect of the present invention, a connector comprises an insulative housing having a receiving slot formed therein, a cavity at rear of the receiving slot and communicating with the receiving slot, and a resisting block located under the cavity and extending slantwise backwardly and upwardly in the cavity; a plurality of contacts retained in the insulative housing; an optical module for transmitting optical data and being movably received in the receiving slot along a front-to-back direction; and a compression coil spring sandwiched between the insulative housing and the optical module. The compression coil spring has a front end for biasing the optical module forwardly and a rear end for being resisted upwardly by the resisting block.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Figure 1:
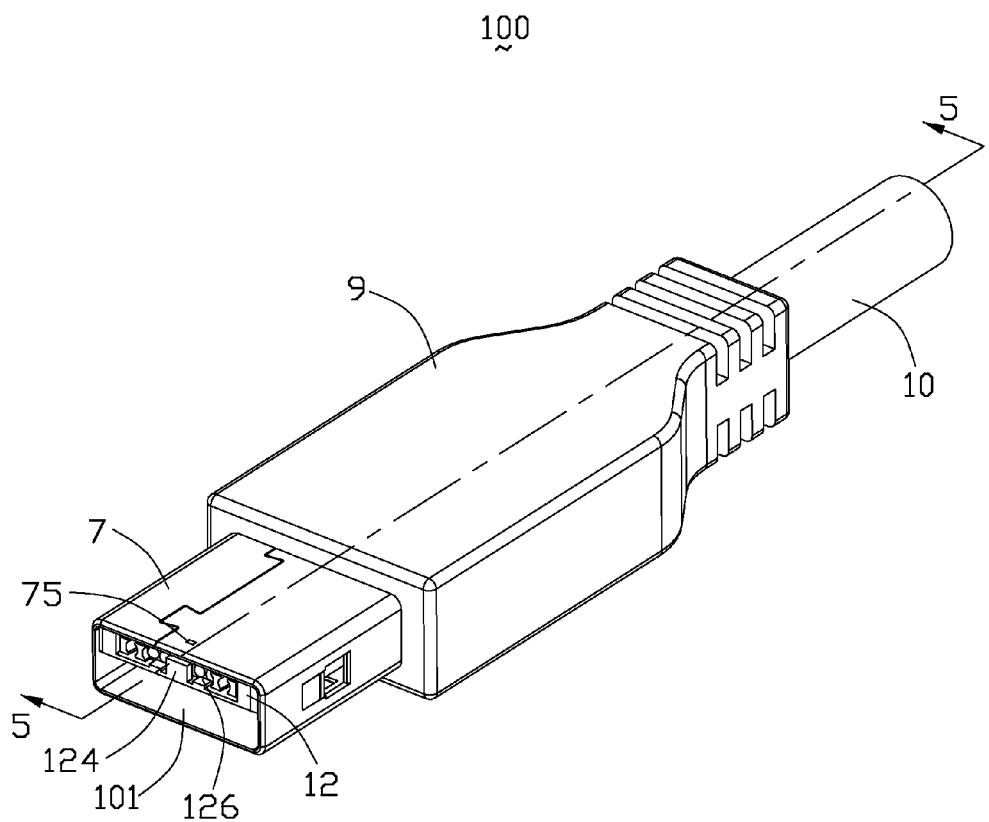
FIG. 1 is an assembled, perspective view of a connector according to an embodiment of the present invention.
Figure 2:
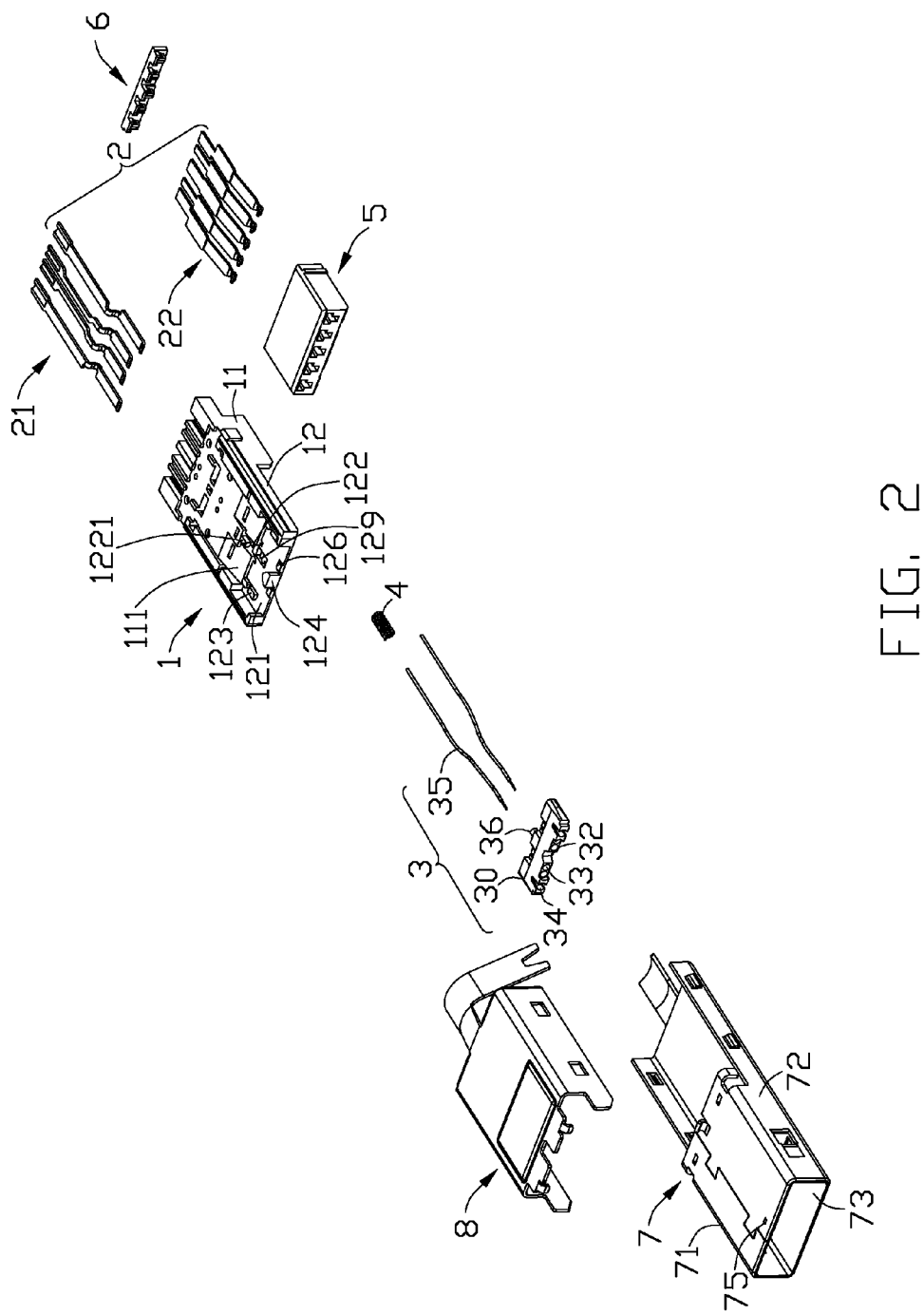
FIG. 2 is an exploded perspective view of the connector shown in FIG. 1.
Figure 3:
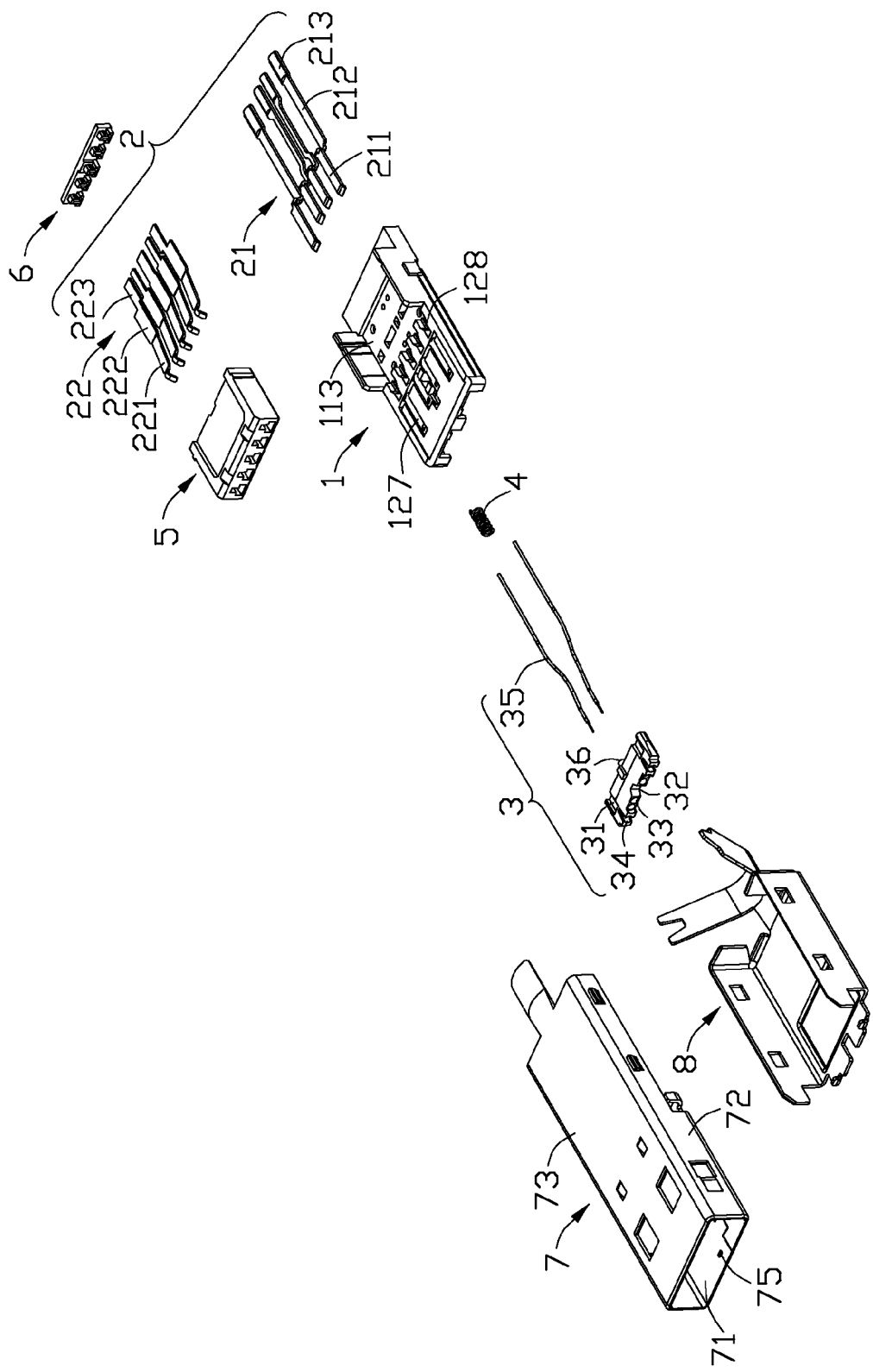
FIG. 3 is similar to FIG. 2, but viewed from another aspect.
Figure 4:
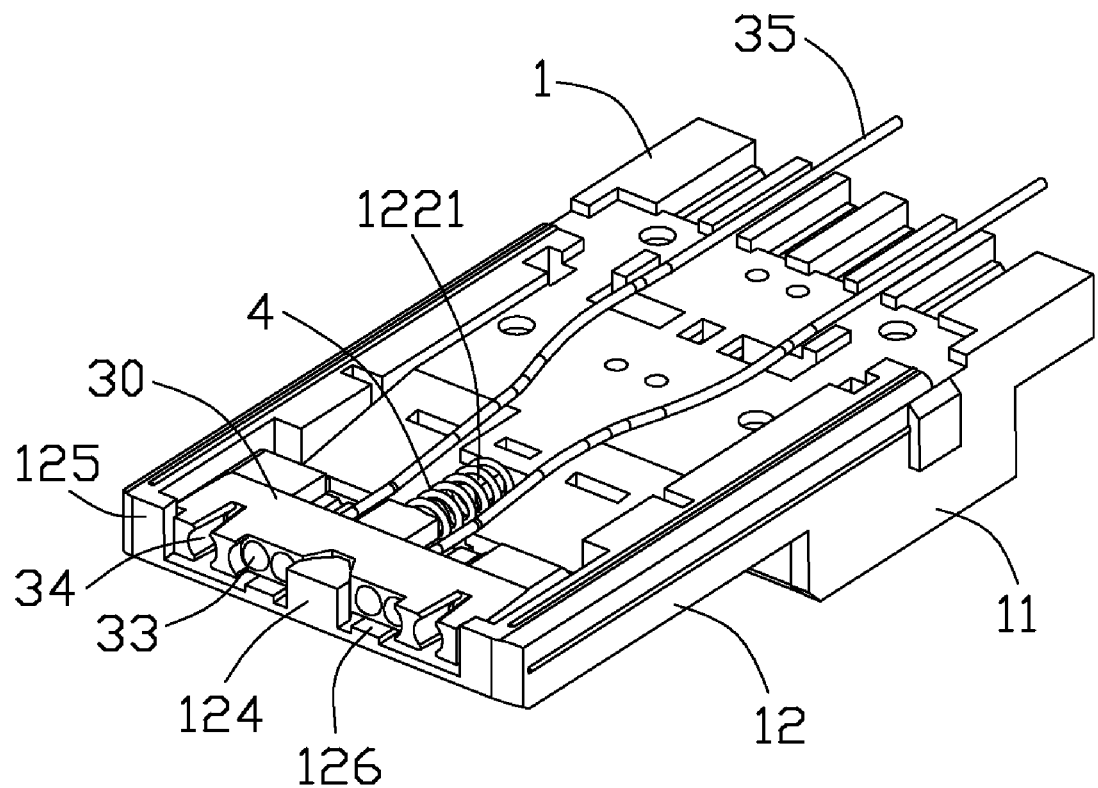
FIG. 4 is a partially assembly view of the connector shown in FIG. 1.
Figure 5:
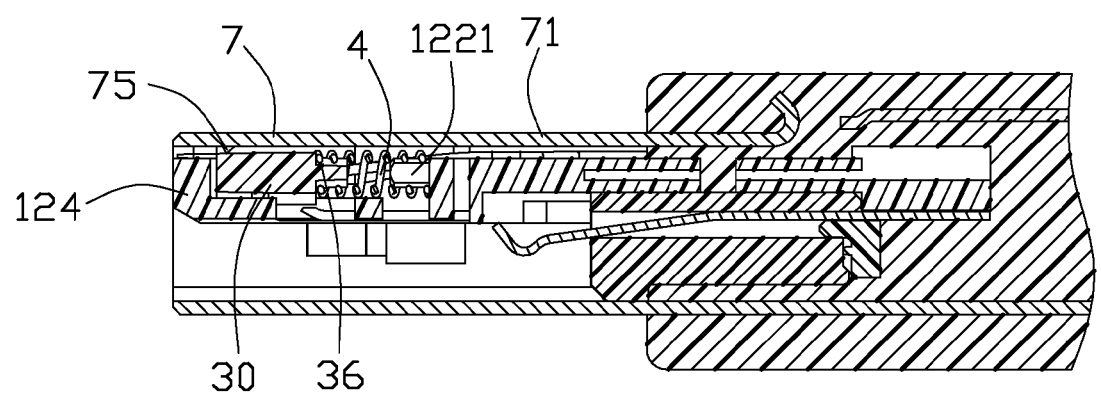
FIG. 5 is a cross-sectional view of the connector taken along line 5-5 shown in FIG. 1.
Figure 6:
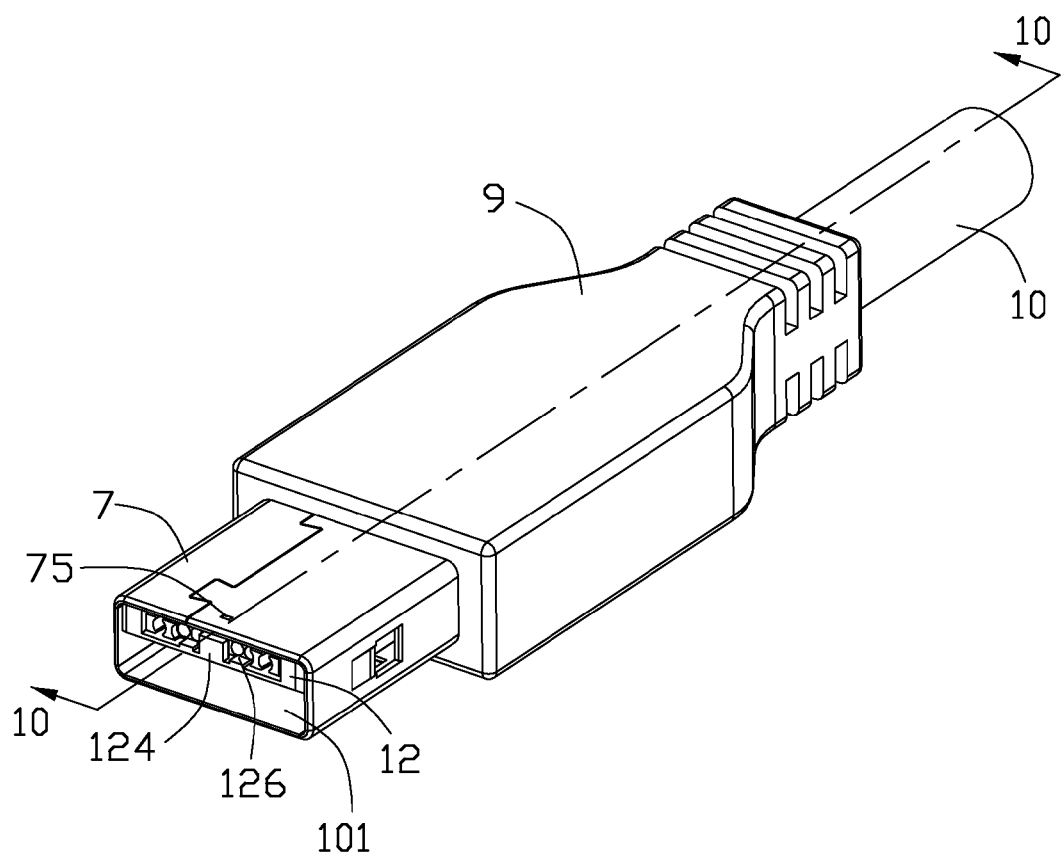
FIG. 6 is an assembled, perspective view of a connector according to another embodiment of the present invention.
Figure 7:
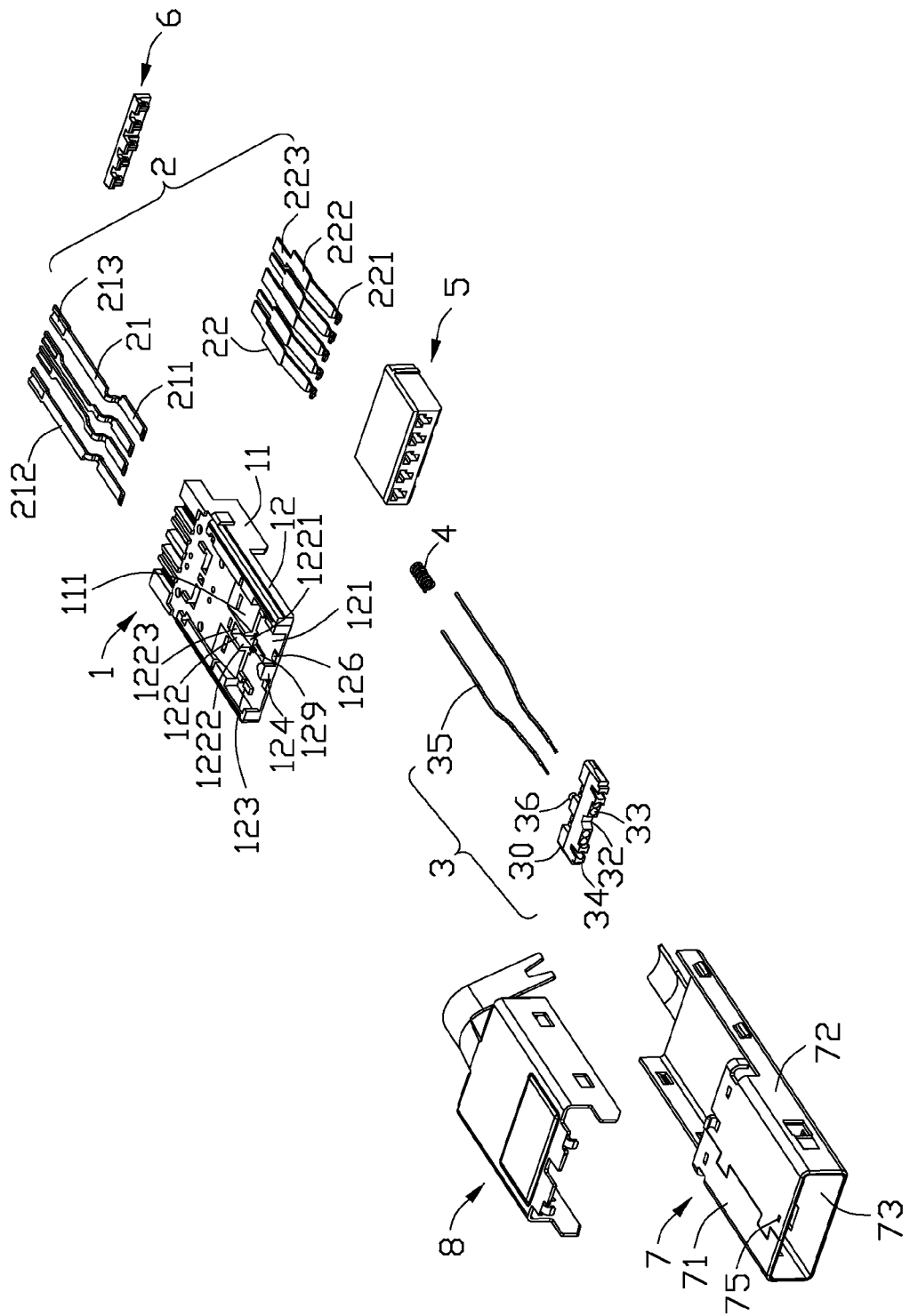
FIG. 7 is an exploded perspective view of the connector shown in FIG. 6.
Figure 8:
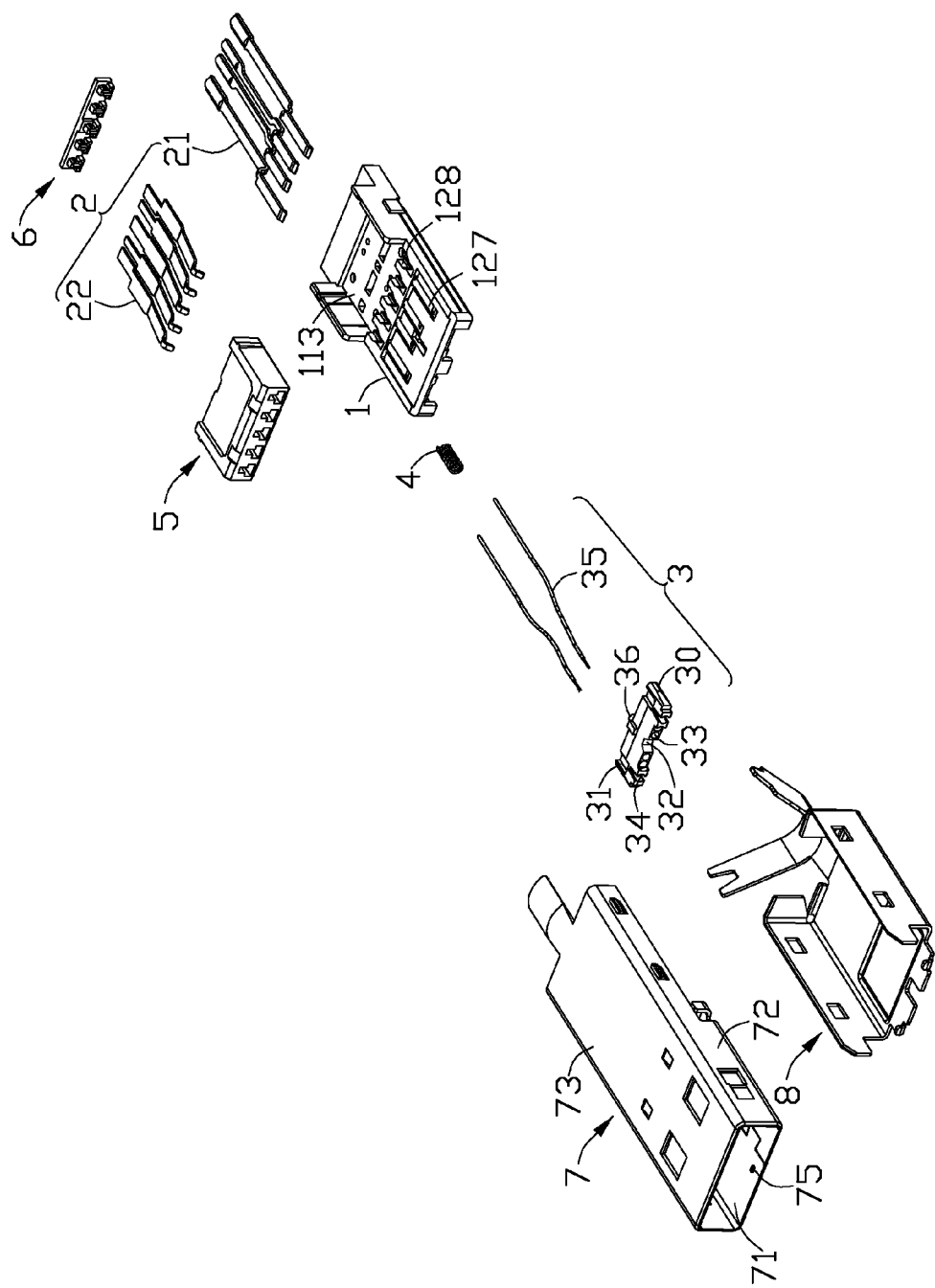
FIG. 8 is similar to FIG. 7, but viewed from another aspect.
Figure 9:
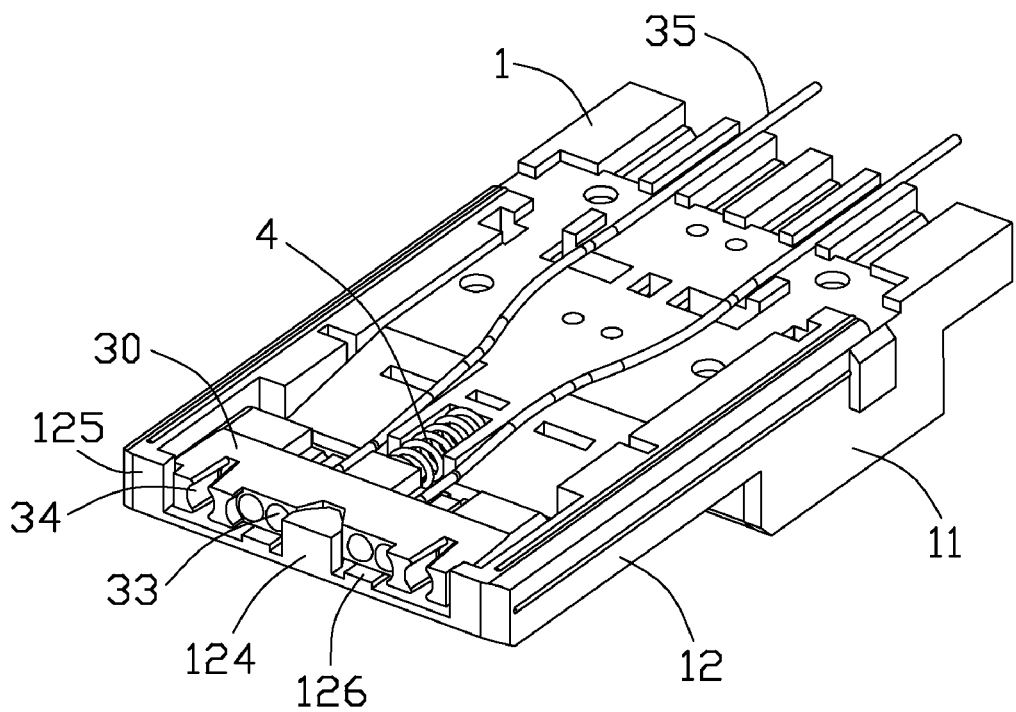
FIG. 9 is a partially assembly view of the connector shown in FIG. 6.
Figure 10:
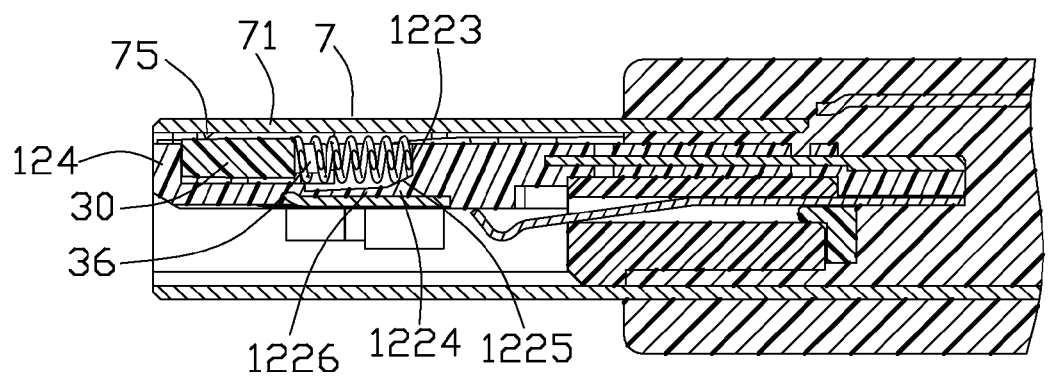
FIG. 10 is a cross-sectional view of the connector taken along line 10-10 shown in FIG. 6.

Referring to FIGS. 1-3, A connector 100 according to the present invention of a first embodiment is a plug of a USB connector cable assembly and comprises an insulative housing 1, a set of contacts 2 attached to the insulative housing 1, an optical module 3 for transmitting optical data and being coupled to the insulative housing 1, a compression coil spring 4 for urging the optical module 3 moving forwardly, a spacer 5 retained in the insulative housing 1, an insulator 6 for engaging with the spacer 5, a first metal shell 7 and a second metal shell 8 shielding the insulative housing 1, a plastic case 9 surrounding the first and second metal shell 7, 8, and a cable 10 for electrical connection to the contacts 2.

Referring to FIG. 1-5, The insulative housing 1 defines a mating portion 101, and includes a base portion 11 and a tongue portion 12 extending forwardly from a front end of the base portion 11 into the mating portion 101. The insulative housing 1 has a pair of fiber grooves 111 formed on an upper surface thereof and extending on the tongue portion 12 and the base portion 11. The base portion 11 has a depression 113 recessed upwardly from a lower surface thereof for retaining the spacer 5. The tongue portion 12 has a receiving slot 121 recessed downwardly from an upper surface thereof, a cavity 122 at back of the receiving slot 121 and communicating with the receiving slot 121 for receiving the compression coil spring 4, and a post 1221 extending forwardly into the receiving slot 121 for retaining a rear end of the compression coil spring 4. A pair of blocks 123 are formed on the tongue portion 12 and extend in the receiving slot 121. The tongue portion 12 has a reception groove 129 being under the receiving slot 121 and communicating with the receiving slot 121. The tongue portion 12 has a V-shaped first stopping portion 124 located at front and midst of the receiving slot 121, a pair of second stopping portions 125 located at front and two sides of the receiving slot 121, and a pair of protrusions 126 formed at two lateral sides of the first stopping portion 124 and between the second stopping portions 125. The V-shaped first stopping portion 124 gradually reduces from a widest front end to a narrowest back end. The protrusion 126 protrudes upwardly into the receiving slot 121. A set of first passageways 127 and a set of second passageways 128 are formed at a lower surface of the tongue portion 12 in a condition that the first passageways 127 are arranged in a front row along a transverse direction and the second passageways 128 are arranged in a back row parallel to the front row.

Referring to FIGS. 2 to 3, the contacts 2 are adapted for USB 3.0 protocol, and include a number of first contacts 21 and a number of second contacts 22. The first contacts 21 are adapted for USB 2.0 protocol and each includes a stiff first contacting portion 211 retained in the first passageway 127, a first tail portion 213 for electrical connection to the cable 10, and a first connecting portion 212 connecting the first contacting portion 211 and the first tail portion 213 and being retained in the base portion 11. The second contacts 22 include two pair of differential contacts and a grounding contact located between the two pair of differential contacts. Each second contact 22 includes a resilient second contacting portion 221 received in the second passageway 128, a second tail portion 223 for electrical connection to the cable 10, and a second connecting portion 222 connecting the second contacting portion 221 and the second tail portion 223 and being retained in the spacer 5. The insulator 6 is retained in the spacer 5 to retain the second contacts 22 in the spacer 5 firmly. In this embodiment, the first contacts 21 are assembled to the insulative housing 1, the second contacts 22 are assembled to the spacer 5 and form as a module so as to be assembled to the insulative housing 1, in other embodiment, the first contacts 21 could be insert molded into the insulative housing 1, the second contacts 22 could be insert molded with the spacer 5 and form as a module so as to be assembled to the insulative housing 1.

Referring to FIGS. 1-5, the optical module 3 comprises a main body 30 being movably received in the receiving slot 121 along a front-to-back direction which is perpendicular to the transverse direction, and a pair of fibers 35 attached to the main body 30 and received in the fiber grooves 111. The main body 30 has a pair of sliding slots 31 formed at a lower surface thereof for sliding on the blocks 123 along the front-to-back direction, a V-shaped slot 32 recessed backwardly from a front face thereof and fitted in with the V-shaped first stopping portion 124, a set of lenses 33 attached to the main body 30 and located at two lateral sides of the V-shaped slot 32 for optically coupling with the fibers 35, and a pair of retaining holes 34 formed thereon and located at two lateral sides of the lenses 33 for accommodating a pair of columniations on a complementary receptacle so as to align the lenses 33 with lenses on the receptacle and transmit optical data therebetween reliably. A pole 36 protrudes backwardly from the main body 30 so as to be received in a front end of the compression coil spring 4. Therefore, the optical module 3 could be biased forwardly by the compression coil spring 4.

Referring to FIGS. 2-5, the first metal shell 7 includes a pair of opposed top plate 71 and bottom plate 73, and a pair of side plates 72 connecting the top plate 71 and the bottom plate 73. The top plate 71 has a projection 75 projecting downwardly therefrom for abutting against the main body 30 downwardly to retain the main body 30 in the receiving slot 121.

When the connector 100 is inserted into the complementary receptacle for mating with the receptacle, the optical module 3 is pushed backwardly by the receptacle and moves backwardly in the receiving slot 121. Because the rear end of the compression coil spring 4 is retained in the post 1221 of the insulative housing 1, when the lenses 33 and the corresponding lenses on the receptacle are misaligned, the optical module 3 will vibrate in a height direction to make the lenses 33 align with the lenses on the receptacle and transmit optical data therebetween reliably, the reception groove 129 will offer a space for the optical module 3 vibrating in the height direction. When the connector 100 is extracted out from the complementary receptacle, the optical module 3 is biased forwardly by the compression coil spring 4 and moves forwardly in the receiving slot 121, the V-shaped first stopping portion 124 fits in with the V-shaped slot 32 for resisting the optical module 3 backwardly and sidewardly so as to prevent the optical module 3 moving in the front-to-back and transverse direction, the second stopping portions 125 abut against the front face of the main body 30 to prevent the optical module 3 moving forwardly, the projection 75 abuts against the main body 30 downwardly and the protrusions 126 abut against the main body 30 upwardly so as to retain the optical module 3 therebetween. Therefore, the first stopping portion 124 and the second stopping portions 125 present as a stopping device for orientating the optical module 3 in the front-to-back and the transverse direction, the protrusions 126 and the projection 75 present as a resisting device for orientating the optical module 3 in a height direction of the connector 100, the optical module 3 will be orientated on its original position firmly and accurately, and the optical data will be transmitted between the connector and the receptacle reliably.

Referring to FIG. 6-10, in a second embodiment of the present invention, the cavity 122 is surrounded by a bottom wall 1226, a pair of side walls 1222 extending upwardly from two sides of the bottom wall 1226, and a rear wall 1223 connecting the side walls 1222 and located at a rear portion of the cavity 122. A retaining block 1224 connect the bottom wall 1226 and the rear wall 1223 and locates under the compression coil spring 4 for resisting the compression coil spring 4. The rear end of the compression coil spring 4 is orientated between the top plate 71 of the shell 7 and the retaining block 1224. The retaining block 1224 defines a slanted face 1225 extending backwardly and upwardly for guiding the compression coil spring 4 compressing backwardly and exerting the elasticity of the compression coil spring 4.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A connector comprising:
    an insulative housing having a receiving slot formed therein and a post protruding forwardly towards the receiving slot;
    a plurality of contacts retained in the insulative housing;
    an optical module for transmitting optical data and being movably received in the receiving slot along a front-to-back direction; and
    a compression coil spring sandwiched between the insulative housing and the optical module, and having a front end for biasing the optical module forwardly and a rear end for being retained on the post.

2. The connector according to claim 1, wherein the insulative housing has a cavity at rear of the receiving slot and communicating with the receiving slot for receiving the compression coil spring, the post extends forwardly into the cavity.

3. The connector according to claim 1, wherein the optical module comprises a main body for being movably received in the receiving slot, a plurality of lenses attached to the main body, and a plurality of fibers for optically coupling with the lenses, the main body has a pole extending backwardly for retaining the front end of the compression coil spring.

4. The connector according to claim 1, wherein the insulative housing has a reception groove under the compression coil spring to offer a space for the compression coil spring vibrating in a height direction of the insulative housing.

5. The connector according to claim 1, wherein the insulative housing has a set of blocks extending in the receiving slot, the optical module has a set of sliding slots formed at a lower surface thereof for sliding on the blocks along the front-to-back direction.

6. The connector according to claim 1, wherein the insulative housing has a V-shaped first stopping portion located at front and midst of the receiving slot, the V-shaped first stopping portion gradually reduces from a widest front end to a narrowest back end, the optical module has a V-shaped slot recessed backwardly from a front face thereof for accordantly accommodating the V-shaped first stopping portion.

7. The connector according to claim 6, wherein the insulative housing has a pair of second stopping portions located at two lateral sides of the V-shaped first stopping portion for abutting against the front face of the optical module.

8. The connector according to claim 1, wherein the insulative housing has a pair of protrusions located at front of the receiving slot and protruding upwardly towards the receiving slot for abutting against a lower surface of the optical module upwardly.

9. The connector according to claim 1, wherein the connector comprises a metal shell shielding the insulative housing, the shell has a top plate for covering the receiving slot and defining a projection projecting downwardly therefrom for abutting against an upper surface of the optical module downwardly.

10. A connector comprising:
an insulative housing having a receiving slot formed therein, a cavity at rear of the receiving slot and communicating with the receiving slot, and a resisting block located under the cavity and extending slantwise backwardly and upwardly in the cavity;
a plurality of contacts retained in the insulative housing;
an optical module for transmitting optical data and being movably received in the receiving slot along a front-to-back direction; and
a compression coil spring sandwiched between the insulative housing and the optical module, and having a front end for biasing the optical module forwardly and a rear end for being resisted upwardly by the resisting block.

11. The connector according to claim 10, wherein the cavity is surrounded by a bottom wall, a pair of side walls extending upwardly from the bottom wall, and a rear wall connecting the side walls and located at rear of the cavity, the resisting block connects the bottom wall and the rear wall.

12. The connector according to claim 10, wherein the connector comprises a metal shell shielding the insulative housing and defining a top plate for covering the receiving slot and the cavity, the rear end of the compression coil spring is sandwiched between the top plate and the resisting block.

13. The connector according to claim 12, wherein the insulative housing comprises a base portion and a tongue portion extending forwardly from the base portion, the receiving slots and the cavity are recessed downwardly from an upper surface of the tongue portion, the contacts comprise contacting portions disposed on a lower surface of the tongue portion.

14. The connector according to claim 13, wherein the tongue portion has a V-shaped first stopping portion extending upwardly therefrom and being located at front of the receiving slot, the V-shaped first stopping portion gradually reduces from a widest front end to a narrowest back end, the optical module has a V-shaped slot recessed backwardly from a front face thereof for accordantly accommodating the V-shaped first stopping portion.

15. The connector according to claim 13, wherein the tongue portion has a pair of protrusions protruding upwardly towards the receiving slot and located at front of the receiving slot for abutting against a lower surface of the optical module upwardly, the top plate of the shell has a projection projecting downwardly therefrom for abutting against an upper surface of the optical module downwardly, the optical module is sandwiched between the projection and protrusions in the vertical direction.

16. The connector according to claim 10, wherein the connector is a plug connector, the contacts are adapted for USB 3.0 proposal.

17. An electrical connector comprising:
an insulative housing defining a receiving slot;
a cavity communicatively located behind the receiving slot;
an optical module received in the receiving slot and back and forth moveable along a front-to-back direction;
a pole unitarily rearwardly from a rear end of the optical module; and
a coil spring located behind the optical module with a front end surrounding the pole, and a rear end received in the cavity; wherein
a rearward upward wedge structure is formed in the cavity for allowing the rear end the coil spring to move thereon during compression of the coil spring due to mating with a complementary connector so as to assure the front end of the coil spring is forced toward the housing for efficiently retaining the optical module in the receiving slot in a floating manner.

* * * * *